(12) United States Patent
Hatch et al.

(10) Patent No.: US 9,476,418 B2
(45) Date of Patent: Oct. 25, 2016

(54) SYSTEMS AND METHODS FOR DETERMINING MECHANICAL STRESS OF A COMPRESSOR

(71) Applicant: General Electric Company, Schenectady, NY (US)

(72) Inventors: Charles Terrance Hatch, Gardnerville, NV (US); Lam Arthur Campbell, Tomball, TX (US); Pekka Tapani Sipilä, Aiglsbach (DE)

(73) Assignee: General Electric Company, Schenectady, NY (US)

( * ) Notice: Subject to any disclaimer, the term of this patent is extended or adjusted under 35 U.S.C. 154(b) by 364 days.

(21) Appl. No.: 14/109,567

(22) Filed: Dec. 17, 2013

(65) Prior Publication Data

US 2015/0167662 A1    Jun. 18, 2015

(51) Int. Cl.
| | |
|---|---|
| *G01B 7/16* | (2006.01) |
| *F04B 51/00* | (2006.01) |
| *F04B 37/12* | (2006.01) |
| *G01L 1/24* | (2006.01) |
| *G01L 5/24* | (2006.01) |
| *G01L 1/12* | (2006.01) |

(52) U.S. Cl.
CPC ............. *F04B 51/00* (2013.01); *F04B 37/12* (2013.01); *G01L 1/125* (2013.01); *G01L 1/246* (2013.01); *G01L 5/24* (2013.01); *F05C 2251/12* (2013.01)

(58) Field of Classification Search
CPC ...... G01L 1/246; G01L 3/10; F05C 2251/12; F04B 37/12; F04B 51/00

USPC ............................................... 73/779, 862.69
See application file for complete search history.

(56) References Cited

U.S. PATENT DOCUMENTS

| 4,159,623 A | * | 7/1979 | McReynolds | ............. F02C 6/20 180/69.6 |
| 5,146,790 A | * | 9/1992 | Fish | ........................ G01L 3/105 324/209 |

(Continued)

FOREIGN PATENT DOCUMENTS

| EP | 0454353 A1 | 10/1991 |
| GB | 2383417 A | 6/2003 |
| WO | 2012152720 A1 | 11/2012 |

OTHER PUBLICATIONS

PCT Search Report and Written Opinion issued in connection with corresponding Application No. PCT/US2014/067011 on Mar. 9, 2015.

(Continued)

*Primary Examiner* — Max Noori
(74) *Attorney, Agent, or Firm* — Fletcher Yoder, P.C.

(57) ABSTRACT

A system for determining mechanical stress of a compressor is provided. The system includes a reciprocating compressor. The system also includes a magnetostriction sensor coupled to the reciprocating compressor and configured to measure a change in magnetic permeability of a target material of the reciprocating compressor. Furthermore, the system includes a processor configured to convert the measured change in the magnetic permeability of the target material into an estimated mechanical stress under which the target material is exposed.

18 Claims, 3 Drawing Sheets

(56) References Cited

U.S. PATENT DOCUMENTS

| | | | |
|---|---|---|---|
| 6,624,539 B1* | 9/2003 | Hansen | B06B 1/085 |
| | | | 310/26 |
| 7,056,097 B2 | 6/2006 | Lake | |
| 8,348,628 B2 | 1/2013 | Hala | |
| 2002/0117642 A1* | 8/2002 | Iwata | F04B 27/1804 |
| | | | 251/61.4 |
| 2004/0193384 A1 | 9/2004 | Edlund et al. | |
| 2010/0005896 A1 | 1/2010 | Miller et al. | |
| 2012/0025528 A1 | 2/2012 | Sipilä et al. | |
| 2013/0091954 A1 | 4/2013 | Ullakko et al. | |
| 2013/0312533 A1 | 11/2013 | Berkcan et al. | |

OTHER PUBLICATIONS

U.S. Appl. No. 13/729,468, filed Dec. 28, 2012, Lam Arthur Campbell.

* cited by examiner

SYSTEMS AND METHODS FOR DETERMINING MECHANICAL STRESS OF A COMPRESSOR

BACKGROUND OF THE INVENTION

The subject matter disclosed herein relates to measuring tie-bolt strain in hyper reciprocating compressors.

Hyper reciprocating compressors are used to generate high pressures in industrial settings. For example, hyper reciprocating compressors may generate pressures up to 3500 bar (50,000 psi). The compressors may be used compress ethylene, polyethelene, low-density polyethylene (LDPE), or other suitable substances. Due to the high pressures in the compressor, it becomes difficult to measure pressures inside these compressors traditional methods of intrusive pressure measurement are impractical. To intrusively measure the pressure inside the compressor, a hole typically must be drilled into a cylinder of the compressor, equipment passed through the hole, and the hole resealed to withstand the high pressures.

Alternatively, compressors may rely on non-intrusive measurement, such as using a resistive strain gauge on a modified tie-bolt. However, to modify and install the tie-bolt is costly and requires much time. Furthermore, when the compressors undergo maintenance, the tie-bolt might be replaced or misplaced, thereby an operator loses the ability to monitor the compressor via the resistive strain gauge on the modified tie-bolt. In other compressors, a mechanical clamp-on style resistive strain gauge may be used. Although the clamp-on style resistive strain gauge may be removed at will, these gauges have a limited frequency response (dynamic strain) and often have issues with low signal-to-noise ratios (SNR), gauge creep, or the connection between the gauge and the measured component may be lost due to mechanical failure (e.g., glue fails). Accordingly, it is desirable to provide non-intrusive measurement systems and techniques that overcome the deficiencies of present systems, as described above.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a reciprocating compressor and a magnetostriction-based sensor coupled to the reciprocating compressor. The magnetostriction-based sensor is configured to measure a change in magnetic permeability of a target material of the reciprocating compressor. The system also includes a processor configured to convert the measured change in the magnetic permeability of the target material into an estimated mechanical stress under which the target material is exposed.

In a second embodiment, a magnetostriction-based sensing apparatus includes a sensing device configured to couple to a target material of a reciprocating compressor and to measure a change in a magnetization of the target material for use in determining the pressure inside of the reciprocating compressor. The apparatus also includes a gap located between the sensing device and the target material In a third embodiment, a method for determining strain in a portion of a hyper reciprocating compressor includes coupling a magnetostriction sensor to a target material. The target material is a portion of the hyper reciprocating compressor that experiences mechanical strain when the hyper reciprocating compressor is pressurized. The method also includes determining a change in magnetic properties of the target material when the hyper reciprocating compressor is pressurized. The method further includes determining an estimated mechanical stress of the target material base at least in part on the change in magnetic properties of the target material.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
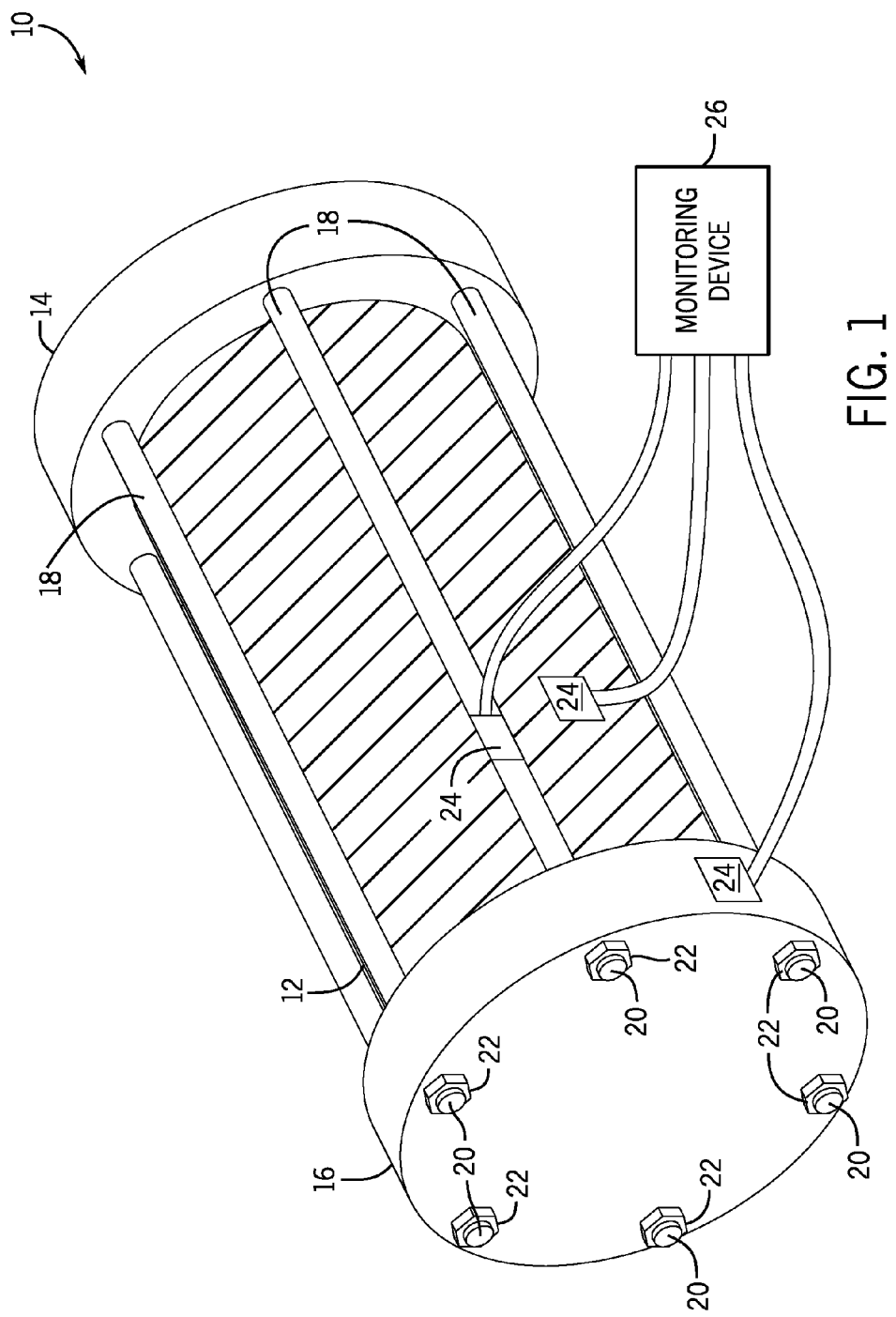
FIG. 1 is a perspective view of an embodiment of a cylinder of a reciprocating compressor using a magnetostriction sensor.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

One such potential method of non-invasive monitoring of pressurization within the compressor is to measure a change in the electrical conductivity of a target material to determine an amount of stress under which the target material is exposed by using a resistive strain gauge. Typically, a resistive strain gauge consists of a flexible insulating backing material supporting a metallic foil pattern. The resistive strain gauge is typically attached to the target material using an adhesive, such as an adhesive from the cyanoacrylate family or some other suitable adhesive. As long as contact between the resistive strain gauge and the target material is maintained, the electric resistance of the target material can be used to determine the strain under which the target material is exposed. However, if even a portion of the strain gauge loses proper connection with the target material, the strain gauge readings may be faulty and unreliable. In other words, the resistive strain gauge requires maintenance of a direct physical connection between the resistive strain gauge and the target material else the resistive strain gauge fails. Furthermore, resistive strain gauges also have low SNRs and have limited frequency responses (e.g., limited in measuring dynamic strain). Another method of non-intrusive measurement includes optical strain gauges. However, optical strain gauges are vulnerable to drawbacks similar to those present in resistive strain gauges.

In certain embodiments, mechanical stress of one or more portions of a hyper reciprocating compressor may be determined from a magnetostriction-based sensor. By using a magnetostriction-based sensor instead of a resistive strain gauge, mechanical stress may be monitored using a contactless or indirect-contact sensor (e.g., insulated direct connection) that is less likely to lose physical connection with a material being monitored. In contrast, if a resistive strain gauge loses complete physical connection (e.g., at least partial adhesive failure) with the material being monitored, the resistive strain gauge fails. Furthermore, since the magnetostriction-based sensor may be used with a gap (e.g., filled with air or an insulating material such as paint) between the magnetostriction sensor and the target material, the magnetostriction sensor may be moved to different locations easily if the magnetostriction sensor is coupled to the target material using brackets, bolts, or braces rather than adhesives that are typically required in attaching a resistive strain gauge, thus improving the quality of measured signal available for analysis. To obtain a good mechanical adhesion and loads transfer for resistive strain gauges, anti-corrosive coating conforming the target may have to be partially removed. This is can be time-consuming and challenging in typical application environment (e.g. if grinding tools are not allowed due to presence of explosive gasses). Also, this measurement point can be susceptible to corrosion if re-coating of the anti-corrosive layer is not done with proper care. Hence, added reliability is gained with magnetostriction-based sensors, of which performance is not compromised by such anti-corrosion coatings. Furthermore, in some cases, a magnetostriction-based sensor may be capable of achieving a higher signal-to-noise ratio (SNR) and a higher frequency response than those available using resistive strain gauges.

It should be pointed out that the effect of a magnetostriction-based sensor can be measured also in-contact fashion electrical impedance measurements, i.e. resistance and reactance, and the changes in impedance. For example, in some embodiments, a magnetostriction-based sensor may utilize at least two electrical contacts that are located at two different locations over the measurement region. In such embodiments, the contacts may be attached to the target by mechanical clamping, welding, or soldering. By orienting the electrical contacts in different configurations, the user can sensitize the impedance measurement for detecting changes in the resistive and reactive part of the impedance due to the applied stress.

FIG. 1 illustrates an embodiment of a portion of a hyper reciprocating compressor 10. The compressor 10 includes one or more cylinders 12 that reciprocate within the compressor 10 to provide pressure to pressurize a fluid (e.g., air, LDPE, etc.) within the compressor 10. Although the illustrated embodiment of the compressor 10 only illustrates a single cylinder 12, some embodiments of the compressor may include 2, 3, 4, 5, 6, or more cylinders 12. The cylinder 12 oscillates within the cylinder shaft 14 at the proximal end of the cylinder 12. At the distal end of the cylinder 12, a cylinder head 16 is coupled to the cylinder 12 using one or more tie-rods 18. Although the currently illustrated embodiment of the compressor 10 includes six tie-rods 18 per cylinder, some embodiments of the compressor 10 may include 1, 2, 3, 4, 5, or more tie-rods 18 per cylinder 12. As illustrated, the tie-rods 18 extend through the cylinder head 16 forming tie-rod protrusions 20. In some embodiments, these protrusions 20 are used to fasten the cylinder head 16 to the cylinder 12. For example, in the illustrated embodiment, each protrusion 20 is threaded and fitted with tie-rod bolt 22. The tie-rod bolts 22 are then fastened to insure sealed connection of the cylinder 12 with the cylinder head 16. As can be appreciated, to insure a seal capable of withstanding the high pressures of a hyper compressor, additional joining layers and/or joining materials may be used in the sealed connection joint between the cylinder head 16 and the cylinder 12. For example, the joint may include gaskets, sealants, or other materials/layers suitable for insuring a sealed connection between the cylinder head 16 and the cylinder 12 under high pressures.

In a hyper compressor, the cylinder head 16 and tie-rods 18 oscillate with the cylinder 12 at high rates (e.g., 180 rpm) and under great pressure. Thus, mechanical stress is induced into the cylinder 12, the cylinder head 16, and the tie-rods 18 during operation of the compressor 10. One potential method of determining the pressure within the compressor 10 is to invasively measure the pressure directly. However, this method of measurement would require creating an opening into the compressor 10 into which the pressure sensor may be inserted. Then the opening must subsequently be sealed sufficiently to withstand the high pressures within the compressor during operation. Furthermore, the presence of this sealed opening introduces an additional (and more highly susceptible) location that may fail during operation of the compressor 10 when exposed to high pressures. Instead, non-invasive methods of monitoring pressurization may be used.

Instead of using a sealed opening, as discussed above, the compressor 10 may include one or more magnetostriction-based sensors 24 coupled to the cylinder 12, the cylinder head 16, and/or the tie-rods 18. Although the illustrated embodiment depicts three magnetostriction sensors 24, some embodiments may include 1, 2, 3, or more magnetostriction sensors 24 each coupled to the cylinder 12, the cylinder head 16, or the tie-rods 18. The magnetostriction sensors 24 may be used to determine an inverse magnetostriction effect (e.g., Villari effect) of the measured material, which may include changes in magnetic permeability and magnetization of a material when subjected to mechanical stress. The magnetic permeability of a material is a proportionality constant that indicates the degree of magnetization of the material in response to an applied magnetic field. The magnitude and direction of the change depends upon the type of material being monitored. For example, when pure polycrystal iron is exposed to mechanical stress, the easy-axis of magnetization of iron turns towards the tensile direction of the stress and away from the vector orientation of the compressive stress. However, when nickel is exposed to mechanical stress, the magnetic permeability of nickel behaves oppositely.

The principal of the inverse magnetostriction effect enables the determination of stress on the measured material based on a change in the magnetic permeability or magnetization of the material from an originally measured value or an expected value for the size and composition of the material. If configurations that utilize AC magnetic fields are used, then changes in the magnetic permeability (or permeability) may cause changes in the induced eddy-currents over the target surface. In other words, a magnetostriction-based system may detect changes in the electromagnetic characteristics of the target material due to stress. The sensed electromagnetic characteristics can include parameters like resistivity, inductance, flux-coupling, complex magnetic reluctance, complex electrical impedance, or other electromagnetic characteristics. Furthermore, using various conversion functions or mapped conversion values, the determined strain may be extrapolated to an estimated pressure within the compressor 10.

For example, relevant information may be sent from the magnetostriction-based sensors 24 to a monitoring device 26. The transmitted information may include the magnetic permeability information, strain information determined from the magnetic permeability information, and/or the estimated pressure within the compressor 10. In other words, either the magnetostriction sensors 24 and/or the monitoring device 26 may be include one or more processors used to convert the magnetic permeability information into strain information determined from the magnetic permeability information, and/or the estimated pressure within the compressor 10. When the magnetostriction sensor 24 includes a processor, the processor and the magnetostriction sensor 24 share a common housing. Furthermore, in some embodiments, the monitoring device 26 may include any suitable computing device having one or more processors, memory, and/or one or more communication interfaces. The memory may include non-transitory, computer-readable medium storing instructions that when executed by the one or more processors causes the processors to perform various actions. For instance, in some embodiments, the communication interfaces may include input devices (e.g., touchscreen, keypad, graphical user interface, network connections, etc.) capable of receiving input information from a user and/or a display capable of displaying the magnetic permeability information, the strain information determined from the magnetic permeability information, and/or the estimated pressure within the compressor 10.

When the magnetostriction sensors 24 are coupled to the tie-bolt 18, the magnetostriction sensors 24 determine a change in magnetic permeability of the tie-bolt 18 due to mechanical stress exerted on the tie-bolt 18 resultant from a pressure loading in the cylinder 12. Similarly, when the magnetostriction sensors 24 are coupled to the wall of the cylinder 12, the magnetostriction sensors 24 determine a change in magnetic permeability of the wall of the cylinder 12 due to mechanical stress exerted on the cylinder 12 resultant from the pressure loading in the cylinder 12. Finally, when the magnetostriction sensors 24 are coupled to the cylinder head 16, the magnetostriction sensors 24 determine a change in magnetic permeability of the cylinder head due to mechanical stress exerted on the cylinder 12 and tie-bolt 16 resultant from the pressure loading in the cylinder 12. Thus, locating the magnetostriction sensors 24 on the cylinder 12, the cylinder head 16, or the tie-rods 18 enable measurement of a change in magnetic permeability that is proportional to the pressurization of the compressor 10.

Figure 2:
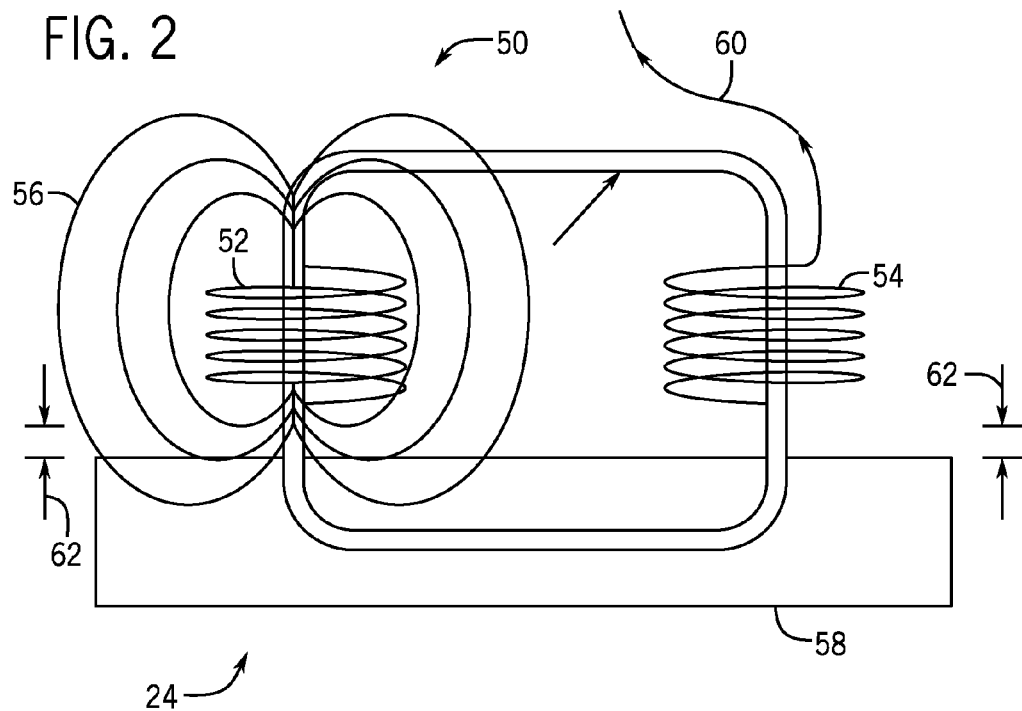
FIG. 2 is a schematic diagram of an embodiment of the magnetostriction-based sensor of FIG. 1.

FIG. 2 illustrates a first embodiment of the magnetostriction sensors 24. As previously discussed, the magnetostriction sensor 24 may be located adjacent to the cylinder 12, the cylinder head 16, and/or the tie-bolts 18 to determine magnetic permeability fluctuations indicative of pressurization fluctuations within the compressor 10. In the illustrated embodiment, the magnetostriction sensor 24 includes a sensor core 50. In some embodiments, the sensor core 50 includes one or more processors configured to analyze measurement information, memory to store the measurement information, and/or a communication interface configured to transmit (wirelessly or physically) the measurement information (raw or analyzed) to a remote processing device (e.g., the monitoring device 26).

Additionally, the sensor core 50 provides support to a drive coil 52 and a sensing coil 54. The drive coil 52 generates a magnetic field 56 using an AC and/or DC (or arbitrary pulse form) current used to create the field. When the target material 58 (e.g., the cylinder 12, the cylinder head 16, and/or the tie-bolts 18) is exposed to the magnetic field 58, the magnetic field 58 creates a secondary magnetic field in the target material 58 according to the magnetic permeability of the target material 58. The magnetic field created in the target material 58 is then detected by the sensing coil 54 and transformed into an electrical signal 60 to be analyzed by the sensor core 50 and/or the monitoring device 26. In some embodiments, the electrical signal 60 (raw or analyzed) is sent to the monitoring device 26 via a wired connection. In other embodiments, the electrical signal 60 is transmitted to the monitoring device 24 from the sensor core 50 using a wireless connection, such as an 805.11 connection, a WirelessHART connection, or any other suitable wireless connection.

One benefit of using a magnetostriction sensor 24 to measure strain rather than a restrictive strain gauge is that the magnetostriction sensor 24 may be used to determine strain in the target material 58 using a contactless connection that may be used without concerns about maintaining the physical connection required for a resistive strain gauge. This may allow for greater flexibility in placement and/or removal of the sensor 24. Thus, the magnetostriction sensor 24 may be located near the target material 58 with a gap 62 located between the magnetostriction sensor 24 unlike a resistive strain gauge. In some embodiments, the magnetostriction sensor 24 may include an insulating layer between the drive coil 52/sensing coil 54 and the target material 58. In other words, the gap 62 may be at least partially filled with an insulating material and/or air. When the gap 62 is completely filled with an insulating material, the drive coil 52/sensing coil 54 maintains an indirect connection with the target material 58, because the insulating material connects the target material 58 and drive coil 52/sensing coil 54 indirectly.

In some embodiments, the gap 62 may be approximately 0.05 inches wide. In other embodiments, the gap 62 may be approximately 0.01 inches to approximately 0.5 inches, approximately 0.3 inches to approximately 0.7 inches, or more than approximately 0.7 inches wide. In other words, the magnetostriction sensor 24 is not susceptible to connection loss to which a resistive strain gauge is susceptible when the resistive strain gauge does not maintain complete physical contact the target material 58. Thus, the contactless or indirect contact connection of the magnetostriction sensor 24 is more capable of maintaining connection between the target material 58 and the magnetostriction sensor 24 through the magnetic field 56 of the magnetostriction sensor 24 and the resultant magnetic field of the target material 58 even when the target material 58 does not physically contact the drive coil 52 or the sensing coil 54.

Figure 3:
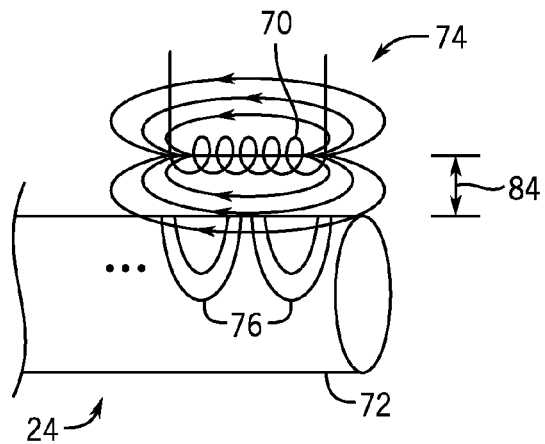
FIG. 3 is a schematic diagram of an alternative embodiment of the magnetostriction-based sensor of FIG. 1.

FIG. 3 illustrates the magnetostriction sensor 24 according to an alternative embodiment. As illustrated, the magnetostriction sensor 24 may include a single coil 70. In such an embodiment, target material 58 (e.g., the cylinder 12, the cylinder head 16, and/or the tie-bolts 18) may be permanently magnetized (e.g., encoded), such that the single coil 70 may sense changes in an encoded target material 72 within the magnetic field 74 due to the magnetic coding 76 of the encoded target material 72. In other words, the magnetic coding 76 of the encoded target material 72 increases the ability of the single coil 70 to determine changes in the encoded target material 72 by increasing the sensitivity of the magnetostriction sensor 24 to changes in the encoded target material 72.

As illustrated, the single coil 70 may be located at a distance away from the encoded target material 72 to form a gap 78 as long as the encoded target material 72 is located within the magnetic field 74. In some embodiments, the gap 78 may be approximately 0.05 inches wide. In other embodiments, the gap 78 may be approximately 0.01 inches to approximately 0.5 inches, approximately 0.3 inches to approximately 0.7 inches, or more than approximately 0.7 inches wide. In some embodiments, the gap 78 may include air or an insulating material that contacts the encoded target material 72 and the field sensor 82. Thus, as previously discussed, the magnetostriction sensor 24 may maintain a physically contactless or indirect contact connection between the single coil 70 and the encoded target material 72, unlike a resistive strain gauge that requires complete physical contact between a target material and the resistive strain gauge.

Figure 4:
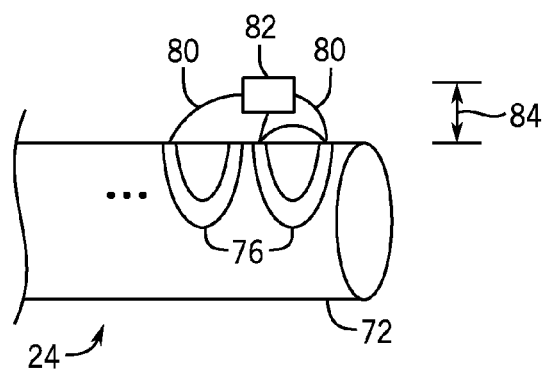
FIG. 4 is a schematic diagram of an another alternative embodiment of the magnetostriction-based sensor of FIG. 1.

FIG. 4 illustrates the magnetostriction sensor 24 according to an alternative embodiment. As illustrated, the magnetostriction sensor 24 of FIG. 4 includes the encoded target material 72 with magnetic encoding 76. Each magnetic encoding 76 section, which is susceptible to stress, creates a magnetic field 80 that may be sensed by a field sensor 82. As long as the field sensor 82 is located within the magnetic field 80 of the encoded target material 72, the field sensor 82 may sense magnetic changes in the encoded target material that may be used to determine strain on the encoded target material 72. Thus, the field sensor 82 may be located with a gap 84 between the encoded target material 72 and the field sensor 82. In some embodiments, the gap 62 may be 0.05 inches wide. In other embodiments, the gap 84 may be approximately 0.01 inches to approximately 0.5 inches, approximately 0.3 inches to approximately 0.7 inches, or more than approximately 0.07 inches wide. In some embodiments, the gap 78 may include air or an insulating material that contacts the encoded target material 72 and the single coil 70. Thus, as previously discussed, the magnetostriction sensor 24 may maintain a physically contactless or indirect contact connection between the field sensor 82 and the encoded target material 72 unlike a resistive strain gauge that requires complete physical contact between a target material 72 and the resistive strain gauge. In some embodiments, a coil may be disposed around a tie-bolt or other target material with a non-contacting magnetostriction sensor located adjacent to the tie-bolt and configured to measure magnetization of the tie-bolt.

Figure 5:
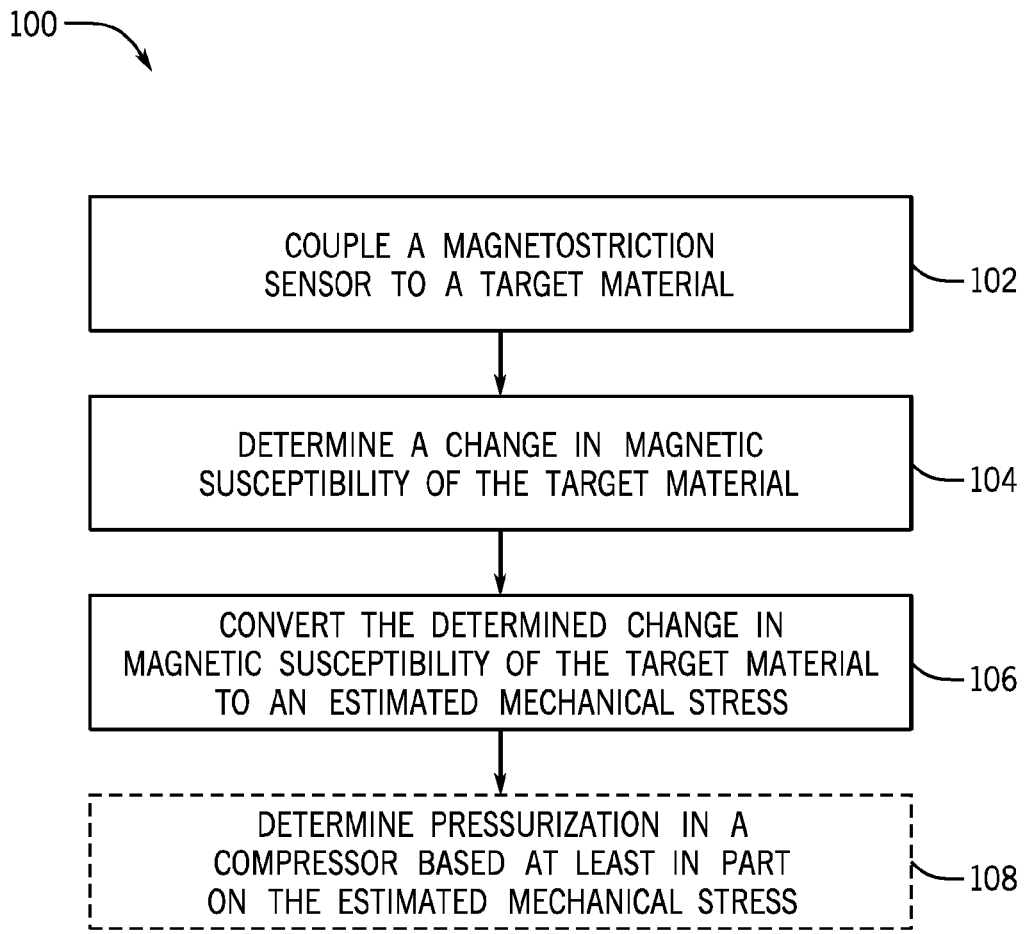
FIG. 5 is a flowchart of an embodiment of a process useful in monitoring pressure within a cylinder using a magnetostriction-based sensor.

FIG. 5 is a flowchart of an embodiment of a method 100 for determining strain of a component of a reciprocating compressor, such as the reciprocating compressor 10. In some embodiments, one or more steps of the method may be stored in the memory as non-transitory, computer-readable medium that cause a processor to perform one or more of the following steps when executed by the processor. The method 100 includes coupling a magnetostriction sensor (e.g., magnetostriction sensor 24) to a target material of the reciprocating compressor that may be magnetically encoded, and the target material includes a portion of the compressor that undergoes strain indicative of pressurization of the compressor (block 102). For example, the magnetostriction sensor 24 may be coupled to the cylinder 12, the cylinder head 16, and/or the tie-rods 18. Furthermore, the magnetostriction sensor (e.g., 24) may be coupled to the target material (e.g., 58, 72) through a connection using clamps, bolts, brackets, braces, adhesives, or other suitable coupling mechanisms. Moreover, the magnetostriction sensor may be coupled to the target material (e.g., 58, 72) using an indirect connection (e.g., through a bolt) such that the magnetostriction sensor (e.g., 24) is located with a gap (e.g., 62, 78, or 84) between the target material (e.g., 58, 72) and the magnetostriction sensor (e.g.,). The method 100 also includes determining a change in the magnetic permeability of the target material (e.g., 58, 72) using the magnetostriction sensor (block 104). The method 100 further includes converting the change in the magnetic permeability of the target material (e.g., 58, 72) to a mechanical strain under which the target material (e.g., 58, 72) is exposed (block 106) using a processor in the magnetostriction sensor (e.g., 24) or a monitoring device (e.g., 26) coupled to magnetostriction sensor (e.g., 24). In some embodiments, the mechanical strain may be used to determine a pressurization of the compressor (block 108). In some embodiments, determining the pressurization of the compressor (e.g., 10) may be performed by the processor in the magnetostriction sensor (e.g., 24) from estimated mechanical strain determined by the magnetostriction sensor. In certain embodiments, the processor in the monitoring device (e.g., 26) is used to determine the pressurization from either a measured change in magnetic permeability that is measured and transmitted by the magnetostriction sensor (e.g., 24) or an estimated mechanical stress estimated by the processor in the magnetostriction sensor (e.g., 24) and sent to the processor in the monitoring device (e.g., 26).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system comprising:
a reciprocating compressor;
a magnetostriction-based sensor coupled to the reciprocating compressor and configured to measure a change in magnetic permeability of a target material of the reciprocating compressor;
a processor configured to:
  convert the measured change in the magnetic permeability of the target material into an estimated mechanical stress under which the target material is exposed; and
  estimate a pressure within the reciprocating compressor based at least in part on the estimated mechanical stress based on the measured change in magnetic permeability.

2. The system of claim 1, wherein the reciprocating compressor comprises one or more cylinders each comprising:
- a cylinder wall;
- a cylinder head; and
- a tie-rod.

3. The system of claim 2, wherein the target material is the cylinder wall, the cylinder head, the tie-rod, or a combination thereof.

4. The system of claim 1, comprising a gap located between the magnetostriction sensor and the target material.

5. The system of claim 1, comprising a monitoring device, wherein the monitoring device comprises the processor.

6. The system of claim 1, wherein the magnetostriction sensor and the processor are located in a common housing.

7. The system of claim 6, wherein the magnetostriction sensor comprises a drive coil and a sensing coil.

8. The system of claim 6, wherein the target material comprises a magnetically encoded target material.

9. The system of claim 8, wherein the magnetostriction-based sensor comprises a lone coil configured to sense changes in a magnetic field emitted by the encoded target material.

10. The system of claim 8, wherein the magnetostriction sensor comprises a field sensor configured to sense changes in a magnetic field emitted by the encoded target material.

11. A magnetostriction-based sensing apparatus, comprising:
- a sensing device configured to:
  - couple to a target material of a reciprocating compressor;
  - measure a change in a magnetization of the target material that corresponds to mechanical stress under which the reciprocating compressor is exposed; and
  - estimate pressure inside of the reciprocating compressor based at least in part on the measured change in magnetization of the target material corresponding to the mechanical stress; and
- a gap located between the sensing device and the target material.

12. The magnetostriction sensing apparatus of claim 11, wherein the sensor comprises a sensing coil configured to measure the change in the electromagnetic characteristic of the target material.

13. The magnetostriction sensing apparatus of claim 12, wherein the sensing device comprises a drive coil configured to create a magnetic field in the target material, wherein the sensing coil is configured to measure changes to the magnetic field as indicative of the change in the electromagnetic characteristic.

14. The magnetostriction sensing apparatus of claim 11, wherein the sensing device comprises a field sensor configured to measure the change in the electromagnetic characteristic.

15. The magnetostriction sensing apparatus of claim 11, wherein the target material comprises a permanently magnetized material.

16. The magnetostriction sensing apparatus of claim 11, comprising an insulative layer at least partially surrounding the sensing device, wherein the sensing device maintains indirect contact with the target material through the insulative layer.

17. A method for determining strain in a portion of a hyper reciprocating compressor:
- coupling a magnetostriction sensor to a target material, wherein the target material is a portion of the hyper reciprocating compressor that experiences mechanical strain when the hyper reciprocating compressor is pressurized;
- measuring a change in magnetic properties of the target material when the hyper reciprocating compressor is pressurized;
- determining an estimated mechanical stress of the target material based at least in part on the change in magnetic properties of the target material; and
- estimating a pressure of the hyper reciprocating compressor based at least in part on the estimated mechanical stress of the target material derived from the determined change in magnetic properties.

18. The method of claim 17, wherein the target material comprises a cylinder of the compressor, a cylinder head of the compressor, a tie-bolt of the compressor, or some combination thereof.

* * * * *